(12) United States Patent
Klein et al.

(10) Patent No.: US 10,694,587 B2
(45) Date of Patent: Jun. 23, 2020

(54) ELECTRICALLY HEATABLE COMPOSITE PANE HAVING A CAPACITIVE SWITCHING REGION

(71) Applicant: SAINT-GOBAIN GLASS FRANCE, Courbevoie (FR)

(72) Inventors: Marcel Klein, Baesweiler (DE); Dirk Doerner, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 326 days.

(21) Appl. No.: 15/740,789

(22) PCT Filed: Nov. 7, 2016

(86) PCT No.: PCT/EP2016/076885
§ 371 (c)(1),
(2) Date: Dec. 28, 2017

(87) PCT Pub. No.: WO2017/077128
PCT Pub. Date: May 11, 2017

(65) Prior Publication Data
US 2018/0176995 A1    Jun. 21, 2018

(30) Foreign Application Priority Data
Nov. 6, 2015   (EP) ..................................... 15193394

(51) Int. Cl.
*H05B 3/84*   (2006.01)
*B32B 17/10*   (2006.01)

(52) U.S. Cl.
CPC ......... *H05B 3/84* (2013.01); *B32B 17/10036* (2013.01); *B32B 17/10174* (2013.01);
(Continued)

(58) Field of Classification Search
CPC ................ H05B 3/84; H05B 2203/011; H05B 2203/014; H05B 2203/016;
(Continued)

(56) References Cited

U.S. PATENT DOCUMENTS 3,440,408 A * 4/1969 Brittan .............. B32B 17/10036
219/522
3,895,433 A * 7/1975 Gruss ................ B32B 17/10036
29/611
(Continued)

FOREIGN PATENT DOCUMENTS

DE           10126869 A1    12/2002
DE      202006006192 U1    7/2006
(Continued)

OTHER PUBLICATIONS

International Preliminary Report on Patentability for International Application No. PCT/EP2016/076885 filed Nov. 7, 2016 on behalf of SAINT-GOBAIN, dated May 8, 2018. 8 pages.
(Continued)

*Primary Examiner* — Benjamin R Shaw
(74) *Attorney, Agent, or Firm* — Pillsbury Winthrop Shaw Pittman LLP

(57) ABSTRACT

A heatable composite pane having a capacitive switching region. A substrate and a cover pane and at least one intermediate layer, which is arranged between the substrate and the cover pane. At least one heating wire and at least two busbars, which are arranged between the cover pane and the intermediate layer. The heating wire is electrically conductingly connected to the busbars such that, upon application of an electrical voltage to the busbars, a heating current flows through the heating wire, whereby the heating wire is heated. An electrically conductive contact wire, which is different from the at least one heating wire, is arranged between the substrate and the intermediate layer or between (Continued)

Figure 1A:
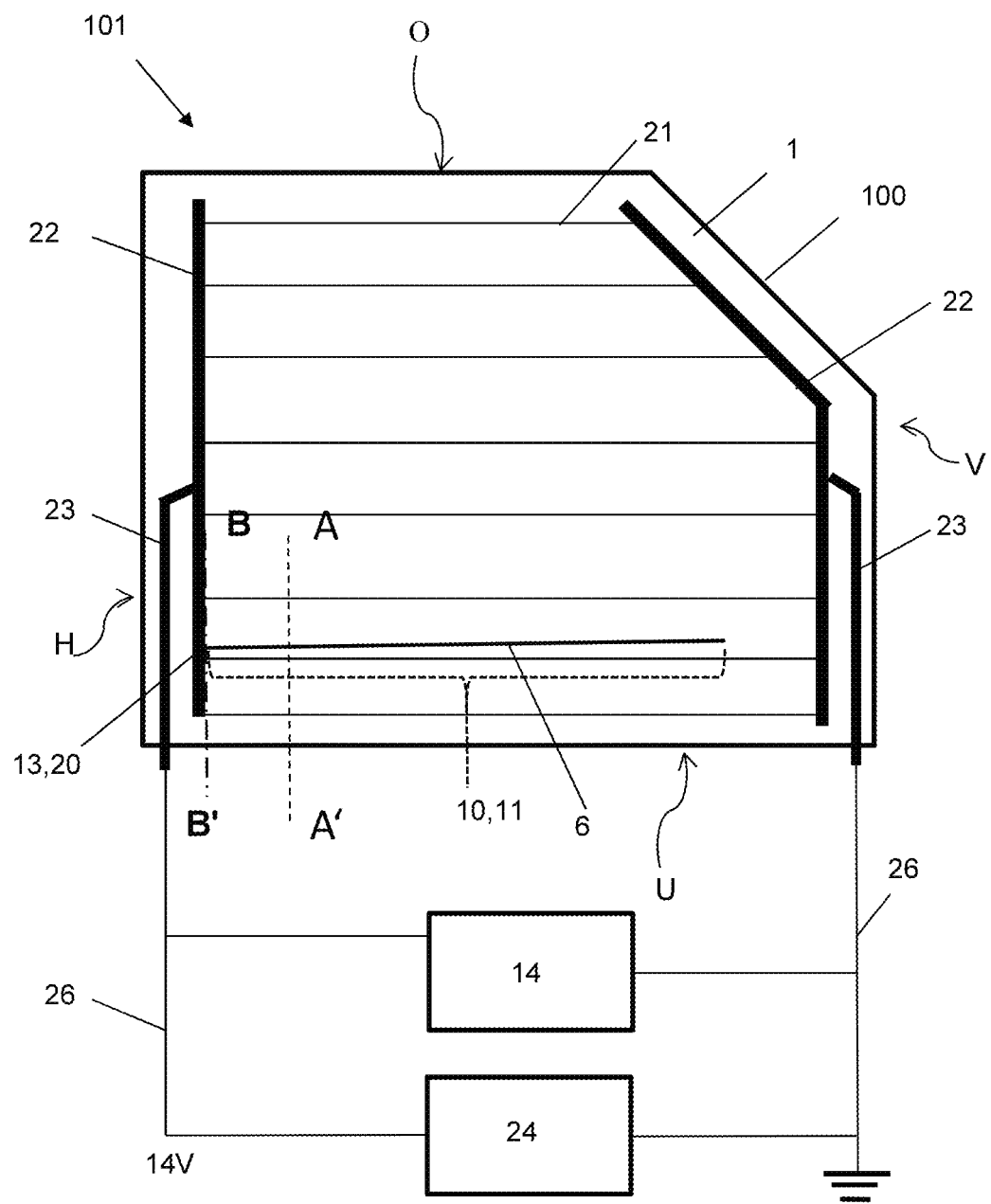

the cover pane and the intermediate layer. At least one region of the electrically conductive contact wire forms a capacitive switching region. The capacitive switching region has at least one contact region and one connection region.

22 Claims, 10 Drawing Sheets

(52) U.S. Cl.
CPC .. *B32B 17/10201* (2013.01); *B32B 17/10385* (2013.01); *B32B 17/10761* (2013.01); *B32B 17/10788* (2013.01); *B32B 2605/006* (2013.01); *H05B 2203/011* (2013.01); *H05B 2203/014* (2013.01); *H05B 2203/016* (2013.01); *H05B 2203/017* (2013.01)

(58) Field of Classification Search
CPC ........ H05B 2203/017; B32B 17/10036; B32B 17/10174; B32B 17/10201; B32B 17/10385; B32B 17/10761; B32B 17/10788; B32B 2605/006
USPC .......................................... 219/203
See application file for complete search history.

(56) References Cited

U.S. PATENT DOCUMENTS

| | | | |
|---|---|---|---|
| 3,995,140 A | 11/1976 | Kuiff et al. | |
| 4,132,881 A | 1/1979 | Ciarniello et al. | |
| 5,798,499 A * | 8/1998 | Shibata | H05B 3/84 219/203 |
| 6,452,514 B1 * | 9/2002 | Philipp | G01D 5/2405 178/18.06 |
| 7,200,921 B2 * | 4/2007 | Loibl | B32B 17/10036 219/203 |
| 2004/0159645 A1 * | 8/2004 | Gillner | B32B 17/10376 219/203 |
| 2006/0081581 A1 * | 4/2006 | Odeh | H05B 3/84 219/203 |
| 2007/0194216 A1 * | 8/2007 | Schwenke | H05B 3/84 250/221 |
| 2009/0014426 A1 | 1/2009 | Baumler | |
| 2013/0075383 A1 * | 3/2013 | Kim | H05B 3/84 219/203 |
| 2014/0151355 A1 * | 6/2014 | Lisinski | B32B 17/06 219/203 |
| 2017/0034875 A1 * | 2/2017 | Weber | H05B 1/0236 |
| 2017/0041987 A1 * | 2/2017 | Weber | H05B 3/84 |
| 2017/0135155 A1 * | 5/2017 | Klein | H05B 3/18 |
| 2017/0317399 A1 * | 11/2017 | Droste | H05B 3/84 |
| 2019/0018366 A1 * | 1/2019 | Weber | B32B 17/10541 |

FOREIGN PATENT DOCUMENTS

| | | |
|---|---|---|
| EP | 0899882 A1 | 3/1999 |
| EP | 1515211 A1 | 3/2005 |
| JP | S57-027855 B | 6/1982 |
| JP | 2002-057518 A | 2/2002 |
| RU | 2394399 C2 | 7/2010 |
| RU | 2532667 C2 | 11/2014 |
| SU | 610479 A3 | 6/1978 |
| WO | 2005/055667 A2 | 6/2005 |
| WO | 2008/113978 A1 | 9/2008 |
| WO | 2015/162107 A1 | 10/2015 |

OTHER PUBLICATIONS

Written Opinion for International Application No. PCT/EP2016/076885 filed Nov. 7, 2016 on behalf of SAINT-GOBAIN, dated Dec. 22, 2016. 7 pages.
International Search Report for International Application No. PCT/EP2016/076885 filed Nov. 7, 2016 on behalf of SAINT-GOBAIN GLASS FRANCE, dated Dec. 22, 2016. 7 pages. (German+English Translation).

* cited by examiner

ELECTRICALLY HEATABLE COMPOSITE PANE HAVING A CAPACITIVE SWITCHING REGION

CROSS-REFERENCE TO RELATED APPLICATIONS

The present application is the U.S. National Stage of International Patent Application No. PCT/EP2016/076885 filed on Nov. 7, 2016 which, in turn, claims priority to European Patent Application No. 15193394.2 filed on Nov. 6, 2015.

The invention relates to an electrically heatable composite pane having a capacitive switching region, a pane arrangement, a method for producing the composite pane, and use thereof.

Composite panes typically comprise two panes, for example, an outer pane and an inner pane that are bonded together via an intermediate layer, made, for example, of a thermoplastic polyvinyl butyral (PVB) film. Electrically heatable composite panes are, for example, equipped with heating wires and are frequently used in automotive engineering, for example, as a side window pane, as is known from DE10126869A1 or WO02005055667A2. The heating wires are embedded in the surface of the thermoplastic intermediate layer. Typically, busbars are provided for the electrical contacting of the heating wires. Suitable busbars are, for example, strips of a copper foil that are connected to an external voltage source. The heating wires run between the busbars such that after application of an electrical voltage, an electrical current can flow through the heating wires, by which means the heating action is obtained.

Furthermore, it is known that switching regions can be formed by an electrode or by an arrangement of two coupled electrodes, for example, as capacitive switching regions. When an object approaches the switching region, the capacitance of the surface electrode against ground or the capacitance of the capacitor formed by the two coupled electrodes changes. The capacitance change is measured by a circuit arrangement or a sensor electronics system and when a threshold value is exceeded, a switching signal is triggered. Circuit arrangements for capacitive switches are known, for example, from DE 20 2006 006 192 U1, EP 0 899 882 A1, U.S. Pat. No. 6,452,514 B1, and EP 1 515 211 A1.

From WO 2015/162107 A1, a capacitive sensor in connection with heating wires is known, wherein the capacitive sensor has no galvanic connection to a busbar for introduction of a heating current. U.S. 2013/0075383 A1 presents a wire mesh that serves as a window heater and capacitive sensor.

The object of the present invention consists in providing an improved heatable composite pane having a capacitive switching region that can be simply and economically integrated into the composite pane and that hinders vision through the pane only slightly or not at all. A contact sensor can be formed in a simple manner with the capacitive switching region. The object of the present invention is accomplished according to the invention by a heatable composite pane in accordance with the disclosure claim 1. Preferred embodiments emerge from the disclosure subclaims.

The composite pane according to the invention is preferably a vehicle pane such as a side pane, a windshield, a rear window, or a roof panel. The composite pane according to the invention can, however, also be an architectural pane or a glazing in furniture, for example, a refrigerator, a freezer, or an electric heater or mirror element.

The composite pane according to the invention is preferably a side pane for an openable side window of a vehicle. This means a side window that can be opened and closed again by substantially vertical displacement of the side pane into the vehicle door.

The composite pane and in particular the side pane has an upper edge, a lower edge, a front edge, and a rear edge. In the case of a side pane, "upper edge" denotes the side edge of the side pane that points upward in the installed position. "Lower edge" denotes the side edge that points downward toward the ground in the installed position. "Front edge" denotes the side edge that is directed forward in the driving direction. "Rear edge" denotes the side edge that is directed toward the rear in the driving direction.

The invention is a heatable composite pane having a capacitive switching region, at least comprising:
- a substrate and a cover pane and
- at least one intermediate layer that is arranged areally between the substrate and the cover pane,
- at least one heating wire and at least two busbars, which are arranged between the cover pane and the intermediate layer, wherein the heating wire is electrically conductingly connected to the busbars such that upon application of an electrical voltage to the busbars, a heating current can flow through the heating wire, by which means the heating wire can be heated, wherein
- an electrically conductive contact wire is arranged between the substrate and the intermediate layer or between the cover pane and the intermediate layer,
- at least one region of the electrically conductive contact wire forms a capacitive switching region,
- the capacitive switching region has at least one contact region and one connection region, the contact region is electrically connected to the connection region and the connection region can be electrically connected to a sensor electronics system.

Here, the contact wire is different from the at least one heating wire.

The composite pane comprises at least a substrate and a cover pane. The substrate and the cover pane are bonded to one another via an intermediate layer, preferably a thermoplastic intermediate layer. If the composite pane serves for separating an interior space from an external environment, for example, of a vehicle, either the substrate or the cover pane can face the interior space in the installed position.

In the composite pane, at least one heating wire is embedded in the surface of the intermediate layer. The heating wire runs between a first busbar and a second busbar and is preferably electrically conductingly connected at its ends in each case to one of the busbars. The busbars are intended to be electrically conductingly and, in particular, galvanically connected to an external voltage source such that a current flows through the heating wire between the busbars. The current can heat the heating wires and thus the entire composite pane. The composite pane can thus be conveniently deiced or or freed of moisture condensation.

In an advantageous embodiment, the maximum distance of the busbars from the side edge along which they are arranged is less than 3 cm, preferably less than 2.5 cm, particularly preferably less than 2 cm. In the context of the invention, the maximum distance is measured between the side edge of the composite pane and the edge of the busbar facing away from it. In the example, this distance is sufficiently small such that the busbars are arranged with the electrical contacting in a region that is covered by vehicle body parts and sealing lips of typical motor vehicle side windows.

The busbars must, however, not be positioned too close to the side edge since, otherwise, the bonding of the panes is disturbed and air can penetrate into the composite via the side edge. In an advantageous embodiment, the minimum distance of the busbars from the side edge along which they are arranged is greater than 3 mm, preferably greater than 5 mm. Good results are thus achieved. In the context of the invention, the minimum distance is measured between the side edge of the composite pane and the edge of the busbar facing it.

Although the invention can be realized with a single heating wire, the composite pane according to the invention typically has a plurality of heating wires that run between the busbars. All heating wires are provided with current by the busbars, for which reason only the connection of two connecting cables to the external power source is necessary.

In a preferred embodiment, one busbar is arranged along one of the side edges and the other busbar is arranged along the opposite side edge. In the example of a side pane, the side edge would be, for example, the front edge and the opposite side edge would be the rear edge. Thus, the available, nonvisible regions of the side pane are optimally used.

In this manner, the heating wires can be routed without sharp curves and loops from one side edge (front edge) to the opposite side edge (rear edge), which is aesthetically appealing, facilitates homogeneous distribution of the heating power, and reduces the risk of local overheating.

The heating wires can, in a preferred embodiment, run from the first busbar to the second busbar without sharp curves. Due to the complex shape of composite panes and, in particular, of side windows, in order to distribute the heating effect as homogeneously as possible over the entire pane, at least a portion of the heating wires typically does not run completely rectilinearly between the busbars. Thus, for example, the heating wires near the typically curved upper edge have a slight curvature adapted to the upper edge.

Alternatively, the heating wires can also have a meander-shaped course. In this case, a heating wire runs, starting from the first busbar into the vicinity of the second busbar. There, the heating wire runs like a U-turn without electrically contacting the second busbar and runs back into the vicinity of the first busbar. There, the heating wire again runs like a U-turn without electrically contacting the first busbar and runs back to the second busbar. The heating wire either contacts the second busbar at this point or runs another time or multiple times back and forth meanderingly between the busbars before it contacts the second busbar. The advantage of such a meandering routing of the heating wires resides in the lengthening of the heating wire compared to a direct connection of the busbar. By means of this lengthening, the heating power can be reduced when it would be higher than desirable with a given applied electrical voltage and a given thickness and material of the heating wires.

In an alternative preferred embodiment, both busbars are arranged along the same side edge of the composite pane. The heating wires then run loop-like or meanderingly starting from the first busbar across the pane to the second busbar. In a particularly preferred embodiment, the two busbars are arranged overlappingly, in particular congruently, when looking through the composite pane. In order to avoid a short-circuit, the two busbars are preferably arranged on different sides of the thermoplastic intermediate layer. The heating wire must then be routed one time through the thermoplastic intermediate layer.

Alternatively, the two busbars can also be arranged along the same side edge and nevertheless be arranged on the same side of the thermoplastic intermediate layer. The busbars can then be arranged overlappingly, congruently, or next to one another.

In general, a short-circuit between overlapping busbars or undesirable contact of a heating wire, a contact wire, or a surrounding contact wire, supply lines, or busbars among each other can be prevented by appropriate isolating measures. One such isolating measure is, for example, the application of an electrically insulating film, preferably containing polyimide (PI) and/or polyisobutylene (PIB) and having a thickness from 10 µm to 200 µm.

In a preferred embodiment, the busbars are implemented as strips of an electrically conductive foil. The conductive foil preferably contains aluminum, copper, tinned copper, gold, silver, zinc, tungsten, and/or tin or alloys thereof, particularly preferably copper.

The thickness of the busbars is preferably from 10 µm to 500 µm, particularly preferably from 30 µm to 200 µm, for example, 50 µm or 100 µm. Busbars made of electrically conductive foils with these thicknesses are technically simple to realize and have an advantageous current carrying capacity.

The length of the busbars depends on the design of the composite pane, in particular on the length of the edge along which the busbar is arranged and the number of heating wires to be contacted, and can be appropriately selected in the individual case by the person skilled in the art. The "length" of the typically strip-shaped busbars means their longer dimension, along which they are customarily contacted with the different heating wires or heating wire sections.

The width of the busbars is preferably from 2 mm to 20 mm, particularly preferably from 5 mm to 10 mm. With this, good results are obtained in terms of heating power, but also in terms of visual inconspicuousness.

The busbars can be electrically conductingly connected to the heating wires directly or, for example, via a soldering compound or an electrically conductive adhesive.

In a preferred embodiment of the invention, the connection of the connecting cable to the external power supply is done in the region of one of the side edge is, in the example of a side pane of a vehicle, preferably in the region of the lower edge. Thus, the connecting cable can be concealed in the vehicle body. The composite pane preferably has, for this, at least one supply line, which is electrically contacted with a busbar and runs, starting from the busbar, to the lower edge. Preferably, each busbar is provided with such a supply line. The supply lines can, for example, run in the form of a straight stretch to the lower edge, to be contacted there (for example, in the region of the projection of the busbars onto the lower edge). The supply lines can terminate already within the laminate, i.e., before reaching the lower edge and be contacted by a flat conductor. Alternatively, the supply lines can extend beyond the lower edge for contacting with the external connecting cables outside the laminate.

The supply line in the composite pane is preferably implemented as strips of an electrically conductive foil. The conductive foil preferably contains aluminum, copper, tinned copper, gold, silver, zinc, tungsten, and/or tin or alloys thereof, particularly preferably copper. The thickness of the foil is preferably from 10 µm to 500 µm, particularly preferably from 30 µm to 200 µm, for example, 50 µm or 100 µm. The width of the supply lines is preferably from 2 mm to 20 mm, particularly preferably from 5 mm to 10 mm. Advantageously, the supply lines are made of the same foil as the busbars.

In a preferred embodiment, the heating wire, the contact wire, and/or the surrounding contact wire contains aluminum, copper, tinned copper, gold, silver, zinc, tungsten, and/or tin or alloys thereof, particularly preferably copper and/or tungsten. This is advantageous for the heating power and the capacitive switching behavior since such materials hardly change in their properties even with cyclical heating.

The thickness of the heating wire, of the contact wire, and/or of the surrounding contact wire is preferably from 10 μm to 200 μm, particularly preferably from 20 μm to 100 μm, for example, 30 μm or 70 μm. Thus, in the case of the heating wire, good heating effects are obtained. In addition, such wires are adequately thin to be visually inconspicuous.

Preferably, the heating wire contains a metal, preferably copper and/or tungsten, and the thickness of the heating wire is preferably from 10 μm to 200 μm.

In an advantageous embodiment, the heating wire, the contact wire, and/or the surrounding contact wire has an electrically isolating sheathing, preferably made of a polymer such as polyimide or a polymeric coating. The sheathing is preferably colored and particularly preferably matte-colored, in particular black or green. Such sheathings prevent short-circuits between the heating wire, contact wire, surrounding contact wire, supply lines, busbars, or other electrically conductive structures within the composite pane. At the same time, such sheathings are less light reflective than, for example, bare metal wires, and, consequently, visually less conspicuous.

Preferably, the heating wire has an electrically isolating sheathing, preferably made of a polymer such as a polymeric coating.

The busbars can be arranged between the contacted region of the heating wire, the contact wire, or the surrounding contact wire and the thermoplastic film forming the intermediate layer. Alternatively, the contacted region of the heating wire, the contact wire, or the surrounding contact wire can be arranged between the busbar and the thermoplastic film forming the intermediate layer. Instead of a single busbar, two busbars can also be used, between which the contacted region of the heating wire, of the contact wire, or of the surrounding contact wire is arranged sandwich-like. In this case, the individual busbars can have a lower thickness than with the use of a single busbar in each case.

In a preferred embodiment of the invention, the heating power of the composite pane is at least 250 W/m². With this, an advantageous heating effect is obtained.

In an advantageous embodiment of the composite pane according to the invention, the at least one electrically conductive contact wire is arranged between the substrate and the intermediate layer. The contact wire is thus separated and electrically isolated from the heating wires and busbars by the intermediate layer. This design also has the advantage that the selectivity upon contact of one of the outer surfaces of the composite pane is increased such that contacting the substrate causes a greater change in capacitance than contacting the cover pane.

In an alternative advantageous embodiment, the at least one electrically conductive contact wire is arranged between the cover pane and the intermediate layer, i.e., at the level of the heating wire and of the busbars. Short-circuits with intersecting leads and wires can be avoided by skillful routing of leads, by electrically isolating sheathed wires or electrical insulating films.

At least one region of the electrically conductive contact wire forms a capacitive switching region. The capacitive switching region has at least one contact region and one connection region, wherein the contact region is electrically connected to the connection region. The contact region can also be electrically conductingly connected via a supply line region to the connection region. The connection region can be electrically connected to a sensor electronics system.

The contact region can assume any desired shape and be adapted to the conditions of the respective embodiment. In a simplest case, the contact region can be linear and run in a straight line. In an advantageous embodiment, the contact region is curved and encircles an area A. In an advantageous embodiment of the switching region according to the invention, the contact region has an area A of 1 cm² to 200 cm², particularly preferably of 1 cm² to 9 cm². The length $l_B$ of the contact region is preferably from 1 cm to 14 cm and, particularly preferably from 1 cm to 3 cm. The maximum width $b_B$ of the contact region is preferably from 1 cm to 14 cm and particularly preferably from 1 cm to 3 cm. The contact region can, in principle, have the outline of any desired shape. Particularly suitable contact regions are circular, elliptical, or drop-shaped. Alternatively, angled shapes are possible, for example, triangles, squares, rectangles, trapezoids, or other types of quadrilaterals or higher order polygons.

The length $l_Z$ of the supply line region is preferably from 1 cm to 70 cm and particularly preferably from 3 cm to 8 cm. The width $b_Z$ of the supply line region is preferably from 0.5 mm to 10 mm and particularly preferably from 0.5 mm to 2 mm. The shape of the supply line region is preferably strip-shaped or linear and straight.

In an advantageous embodiment of the composite pane according to the invention, the connection region is arranged at the outer edge of the pane. The distance from the outer edge is preferably less than 10 cm, particularly preferably less than 0.5 cm. This makes it possible to conceal an electrical contacting of the connection region, for example, with a foil conductor, under a visually inconspicuous black imprint or with a covering, for example, a camera housing.

The switching region is a capacitive switching region, in other words, it is specially implemented for capacitive contact detection. In an advantageous embodiment, the switching region forms a linear electrode. In an alternative embodiment, the contact region of the switching region encircles an area and thus forms an enlarged and areally active electrode. The capacitance of the electrode is measured by an external capacitive sensor electronics system. The capacitance of the electrode changes against ground when a body (for example, a human body or an object with a dielectric constant similar to that of a human body) comes into its proximity or, for example, contacts an insulator layer over the electrode. The insulator layer includes, in particular, the substrate or the cover pane itself. The change in capacitance is measured by the sensor electronics system; and when a threshold value is exceeded, a switching signal is triggered. The switching region is defined by the shape and size of the electrode. In accordance with the invention, the contact wire is galvanically connected to one of the busbars at precisely one connection region, in particular, to the busbar that is connected to a positive or negative operating voltage, in other words, is not connected to the ground potential. This means that the contact wire is not galvanically connected to the other busbar. In this embodiment, the sensor electronics system is connected via a first input to that busbar which is galvanically connected to the contact wire and connected to the ground potential via a second input.

In an alternative embodiment that is not part of the invention, the contact wire is galvanically separated from the heating circuit, consisting of the heating wire, busbars, and supply lines and is galvanically connected to the sensor electronics system via its own supply line. In this embodiment, the sensor electronics system is connected to the ground potential via a second input.

In addition to the capacitance measurement against ground just presented, a differential capacitance measurement between the contact wire and another electrically conductive electrically conductive region can also be measured.

In an advantageous embodiment of the invention, the contact wire has a free end, in other words, the contact wire ends freely.

In an advantageous embodiment of the invention, the contact wire has no direct physical contact with the at least one heating wire.

In an advantageous embodiment of the invention, the contact wire extends over at least 10%, preferably at least 20%, more preferably at least 30%, even more preferably at least 40%, and even more preferably at least 50% of a shortest distance between the two busbars, in particular of the shortest distance to a connection point for galvanic connection of the connection region to the one busbar. It can be advantageous for the contact wire to extend over at least 60%, preferably at least 70%, more preferably at least 80%, even more preferably at least 90% of the shortest distance between the two busbars, in particular of the shortest distance to the connection point for the galvanic connection of the connection region to the one busbar.

In an advantageous embodiment of the invention, the contact wire is situated, at least in the projection perpendicular to a pane surface (i.e., in projection through the composite pane), between two immediately adjacent heating wires, wherein the two heating wires extended in each case continuously from one busbar to the other busbar, in particular without having direct physical contact with another heating wire or having a wire diversion or a wire feed of a different heating wire. In particular, the two heating wires are not implemented in the form of a net or a mesh. The contact wire and the at least one heating wire can be situated on the same side of the intermediate layer or on different sides of the intermediate layer.

An alternative composite pane according to the invention has at least one surrounding contact wire that is preferably arranged in the immediate vicinity of the contact wire. The surrounding contact wire is preferably implemented such that it surrounds, in the projection through the composite pane, the contact region of the contact wire, and, in particular, completely borders it. The surrounding contact wire can be connected to the sensor electronics system via another connection region. In other words, the composite pane is contacted by four connecting lines: one connecting line for the contact wire to the capacitive switching region, one connecting line for the surrounding contact wire, and two connecting lines for the busbars for electrical heating of the heating wires.

In such an arrangement, the capacitive switching region and the surrounding contact wire form two electrodes, which are capacitively coupled to one another. The capacitance of the capacitor formed by the electrodes changes with the approach of a body, for example, part of a human body. The change in capacitance is measured by the sensor electronics system and when a threshold value is exceeded, a switching signal is triggered. The sensitive region is defined by the shape and size of the region in which the electrodes are capacitively coupled.

In an alternative embodiment, which is not part of the invention, the heating circuit, i.e., the circuit consisting of the heating wire and busbars as well as, optionally, supply lines, is connected to the sensor electronics system as the second electrode. The contact wire is galvanically isolated from the heating circuit. In other words, the heating wire and the busbars act as a surrounding region or second electrode. In this case, the electrical connection of this second electrode to the sensor electronics system can occur even outside the composite pane, for example, in the region of one of the supply lines or of the connecting cables, with which the busbars are connected to the operating voltage for the heating function, in particular with the ground line. Thus, a separate supply line to the surrounding region is eliminated, and the entire composite pane is still contacted with three connecting lines: one connecting line for the contact wire to the capacitive switching region and two connecting lines for the busbars, wherein one of the connecting lines for the busbars serves as an electrical line connection to the second input of the sensor electronics system.

The capacitive switching region according to the invention and, optionally, the surrounding contact wire, as well as the heating circuit are integrated into the composite pane according to the invention. Thus, no switch or similar separate component that must be mounted on the composite pane is necessary. The composite pane preferably also has no other components that are arranged on its surfaces in the through-vision region. This is particularly advantageous in terms of a thin design of the composite pane as well as only slight interference with visibility through the composite pane.

An advantageous aspect of the invention includes a pane arrangement with a composite pane according to the invention and a sensor electronics system that is electrically connected to the capacitive switching region via the connection region and, optionally, to the surrounding contact wire or to the heating circuit via another connection region. The sensor electronics system is a capacitive sensor electronics system.

In an advantageous embodiment of the switching arrangement according to the invention, the sensitivity of the sensor electronics system is selected such that upon contact of the contact region with a human finger on the substrate, the sensor electronics system outputs a switching signal, and upon contact of the contact region on the cover pane, outputs no switching signal or a different switching signal. Of course, the contacting of the contact region can also be done with multiple fingers or a different part of the human body. In the context of this invention, "contacting" means any interaction with the switching region that results in a measurable change of the measurement signal, i.e., in this case, the capacitance. In particular, this is contacting of an outer surface of the composite pane in a zone obtained by orthogonal projection of the contact region onto the outer surface. Depending on the sensitivity of the arrangement and of the sensor electronics system, an approaching of the outer surface by a human body can already suffice to trigger a switching signal. The outer surface itself need not necessarily be contacted. The human body must merely enter into the electrical field formed by the capacitor arrangement and cause an adequately great change in capacitance.

In an advantageous embodiment of the invention, the surface capacitance $c_I$ between the contact region and the outer surface (IV) of the substrate is greater than the surface capacitance $c_A$ between the contact region and the outer surface (I) of the cover pane.

The surface capacitance $c_I$ or $c_A$ is defined as the capacitance of a plate capacitor of that region of the composite pane resulting from orthogonal projection of the contact region between the contact region and the outer surface of the substrate or the outer surface of the cover pane, with the resultant capacitance normalized over the area of the contact region. Here, the term "outer surface" means the surface of the composite pane that points outward, i.e., away from the composite pane. Accordingly, "inner surface" means the surface of the substrate or of the cover pane that points into the interior of the composite pane and is areally connected to an intermediate layer.

The surface capacitance is thus the capacitance of the entire layer sequence (coating), normalized over the area, from the contact region or from the area encircled by the contact region all the way to the respective outer surface of the composite pane.

In an advantageous embodiment of the composite pane according to the invention, the ratio of the surface capacitance $c_I$ to the surface capacitance $c_A$ is greater than or equal to 1.1:1, preferably greater than or equal to 1.2:1. For such ratios, contacting the outer surface of the substrate can already be distinguished well from contacting the outer surface of the cover pane.

The switching signals output can be of any type and adapted to the requirements of the respective use. Thus, the switching signal can mean a positive voltage, for example, 12 V, no switching signal can mean, for example, 0 V, and another switching signal can mean, for example, +6 V. The switching signals can also correspond to the voltages CAN_High and CAN_Low customary with a CAN-Bus and change by a voltage value between them. The switching signal can also be pulsed and/or digitally coded.

The sensitivity of the sensor electronics system can be determined as a function of the size of the contact region and as a function of the thickness of the substrate, intermediate layers, and cover pane in the context of simple experiments.

The particular advantage of such a pane arrangement according to the invention resides in that the switching signal can be triggered only upon contact of the composite pane from one of the two outer surfaces. In the case of a use of the pane arrangement in a motor vehicle window and installation of the composite pane with the substrate side in the direction of the vehicle interior, it is possible, for example, to reliably avoid triggering the switching operation by individuals from the outside or an unintended triggering of the switching operation by rain or the movement of the windshield wiper, without fundamentally altering the pane construction customary for laminated safety glass. This was unexpected and surprising for the person skilled in the art.

In combination with the pane arrangement just described or alternatively thereto, the sensitivity of the sensor electronics system can be selected such that a switching signal is output when the contact region on the substrate and/or the cover pane is contacted by a human finger and no switching signal or a different switching signal is output when the supply line region on the substrate and/or the cover pane is contacted.

The sensitivity of the sensor electronics system can be determined as a function of the size of the contact region and as a function of the geometry in the context of simple experiments.

In principle, all electrically insulating substrates that are thermally and chemically stable as well as dimensionally stable under the conditions of production and use of the composite pane according to the invention are suitable as substrate and cover pane.

In the context of the present invention, the term "substrate" means a pane-shaped substrate or a substrate pane.

The substrate and/or the cover pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyesters, polyvinyl chloride, and/or mixtures thereof. The substrate and/or the cover pane are preferably transparent, in particular for the use of the pane as a side pane, windshield or rear window of a vehicle or other uses where high light transmittance is desired. In the context of the invention, "transparent" means a pane that has transmittance greater than 70% in the visible spectral range. However, for panes that are not situated in the traffic-relevant field of view of the driver, for example, for roof panels, the transmittance can also be much lower, for example, greater than 5%.

The thickness of the substrate (pane) and/or cover pane can vary widely and thus be ideally adapted to the requirements of the individual case. Preferably, standard thicknesses from 1.0 mm to 25 mm, preferably from 1.4 mm to 2.5 mm are used for vehicle glass and, preferably, from 4 mm to 25 mm for furniture, appliances, and buildings, in particular for electric heaters. The size of the pane can vary widely and is governed by the size of the use according to the invention. The substrate and, optionally, the cover pane have, for example, in automotive engineering and the architectural sector customary areas from 200 cm² up to 20 m².

The composite pane can have any three-dimensional shape. Preferably, the three-dimensional shape has no shadow zones such that it can, for example, be coated by cathodic sputtering. Preferably, the substrates are planar or slightly or greatly curved in one or a plurality of spatial directions. In particular, planar substrates are used. The substrate and the cover pane can be colorless or colored.

The substrate and/or the cover pane preferably have relative permittivity $\varepsilon_{r,1/4}$ from 2 to 8 and particularly preferably from 6 to 8. With such relative permittivities, it was possible to obtain a particularly good differentiation between contacting the contact surface via the outer surface of the substrate compared to the outer surface of the cover pane.

Substrates and/or cover panes are bonded to one another by at least one intermediate layer. The intermediate layer is preferably transparent. The intermediate layer preferably contains at least one plastic, preferably polyvinyl butyral (PVB), ethylene vinyl acetate (EVA), and/or polyethylene terephthalate (PET). The intermediate layer can, however, also contain, for example, polyurethane (PU), polypropylene (PP), polyacrylate, polyethylene (PE), polycarbonate (PC), polymethyl methacrylate, polyvinyl chloride, poly acetate resin, casting resins, acrylates, fluorinated ethylene propylenes, polyvinyl fluoride, and/or ethylene tetrafluoroethylene, or copolymers or mixtures thereof. The intermediate layer can be formed from one or a plurality of films arranged one over another, with the thickness of a film preferably being from 0.025 mm to 1 mm, typically 0.38 mm or 0.76 mm. In other words, the intermediate layer can be constructed from one or a plurality of films. The intermediate layer can preferably be thermoplastic, and, after the lamination, adhesively bond the substrate, the cover pane, and any other intermediate layers to one another. In a particularly advantageous embodiment of the composite pane according to the invention, the intermediate layer is implemented as an adhesive layer made of an adhesive, with which the carrier film is adhesively bonded onto the substrate. In this case, the intermediate layer preferably has the dimensions of the carrier film.

The intermediate layer preferably has relative permittivity from 2 to 4 and particularly preferably from 2.1 to 2.9. With such relative permittivities, it was possible to obtain a particularly good differentiation between contacting the contact surface via the outer surface of the substrate compared to the outer surface of the cover pane.

The terms "substrate" and "cover pane" are selected to differentiate the two panes of a composite pane according to the invention. No statement about the geometric arrangement is associated with the terms. When the composite pane according to the invention is provided, for example, in an opening, for example, of a vehicle or a building, to separate the interior from the external environment, the substrate can be turned toward the interior or the external environment.

The electrical supply line for the contact wire and/or the surrounding contact wire is preferably implemented as a foil conductor or a flexible foil conductor (flat conductor, flat band conductor). The term "foil conductor" means an electrical conductor whose width is significantly greater than its thickness. Such a foil conductor is, for example, a strip or band containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheathing, for example, based on polyimide. Foil conductors that are suitable for the contacting of electrically conductive coatings in panes have a total thickness of, for example, merely 0.3 mm. Such thin foil conductors can be embedded without difficulty between the individual panes in the thermoplastic intermediate layer. Multiple conductive layers electrically isolated from one another can be situated in a foil conductor strip.

Alternatively, thin metal wires can also be used as an electrical supply line. The metal wires contain in particular copper, tungsten, gold, silver, or aluminum or alloys of at least two of these metals. The alloys can also contain molybdenum, rhenium, osmium, iridium, palladium, or platinum.

The electrical line connection between the connection region of the contact wire and/or of the surrounding contact wire and the electrical supply line is preferably done via electrically conductive adhesives, which enabled a reliable and durable electrical line connection between the connection region and the supply line. Alternatively, the electrical line connection can also be done by clamping since the clamp connection is securely fixed against sliding by the lamination procedure. Alternatively, the supply line can also be printed onto the connection region, for example, by means of a metal-containing and, in particular, silver-containing, electrically conductive printing paste. Alternatively, the electrical line connection can be soldered.

In an advantageous embodiment of the invention, the composite pane according to the invention has a light irradiation means and a light deflection means. The light irradiation means and the light deflection means are arranged in or on the substrate and/or on the cover pane or the intermediate layer.

According to the invention, the light irradiation means comprises at least one light source, preferably an LED or OLED. The particular advantage resides in the small dimensions and the low power consumption. The wavelength range emitted by the light source can be selected freely in the range of visible light, for example, based on practical or aesthetic considerations. The light irradiation means can include optical elements, in particular for directing the light, preferably a reflector and/or a light waveguide, for example, a glass fiber or a polymeric optical fiber. The light irradiation means can be arranged at any location of the substrate or the cover pane, in particular on the side edge of the substrate or the cover pane or in a small recess in the middle of the substrate or cover pane.

The light deflection means preferably includes particles, dot grids, stickers, deposits, notches, incisions, line grids, imprints, and/or screen prints and is suitable for decoupling the light transported in the substrate or in the cover pane therefrom.

The light deflection means can be arranged at any position on the level of the substrate or the cover pane. It is particularly advantageous for the light deflection means to be arranged in the region of or in the immediate vicinity of the contact region and thus to enable rapid finding of the otherwise hardly visible contact region. This is particularly advantageous at night or in darkness.

Alternatively, light can be routed to the contact region through a light guide that is arranged on the substrate, the intermediate layer, or the cover pane and can mark the contact region.

Alternatively or in combination, the light irradiation means together with the light deflection means can visualize information on the pane, for example, report or display the switching state of the capacitive switching region, whether, for example, an electrical function is switched on or switched off.

In an alternative advantageous embodiment of the composite pane according to the invention, the contact region is directly markable or marked by an active light source, preferably by a light emitting diode (LED), an organic light emitting diode (OLED), an incandescent light bulb, or other active luminary, such as a luminescent material, preferably a florescent or phosphorescent material.

In another alternative advantageous embodiment of the composite pane according to the invention, the contact region is marked by a colored, preferably a white or black, imprint, for example, a screenprint, on the transparent substrate, the intermediate layer, or the cover pane. This has the particular advantage that the contact region is marked durably and independently of a voltage source. The imprint can also contain a luminescent material, preferably a florescent or phosphorescent material and/or be luminescent.

The composite pane according to the invention can have other functionalities in addition to the heating function effected by the heating wires. In an advantageous embodiment, the composite pane has a reflecting coating for the infrared spectrum. Such a coating can be applied on the surface of the outer pane or the inner pane, preferably on a surface facing the intermediate layer, in order to protect the coating against corrosion and mechanical impact. Alternatively, the coating can be introduced into the composite in the form of a coated thermoplastic film, made, for example, of polyethylene terephthalate (PET). In this case, the coated film is preferably arranged between a first and a second thermoplastic bonding film. IR-reflecting coatings typically have at least one electrically conductive layer. The coating can also have dielectric layers, which serve to regulate the sheet resistance, to protect against corrosion, or to reduce reflection. The conductive layer preferably contains silver or an electrically conductive oxide (transparent conductive oxide, TCO) such as indium tin oxide (ITO). The conductive layer preferably has a thickness from 10 nm to 200 nm. To improve conductivity with simultaneous high transparency, the coating can have a plurality of electrically conductive layers that are separated from one another by at least one dielectric layer. The conductive coating can contain, for example, two, three, or four electrically conductive layers. Typical dielectric layers contain oxides or nitrides, for example, silicon nitride, silicon oxide, aluminum nitride, aluminum oxide, zinc oxide, or titanium oxide. The coating preferably has a smaller area than the composite pane such that a circumferential edge region with a width of preferably 0.5 mm to 10 mm is not provided with the coating. The conductive coating is thus protected inside the intermediate layer against contact with the surrounding atmosphere, a situation advantageous with regard to prevention of corrosion. The composite pane thus configured can also include other uncoated regions, for example, data transmission windows or communication windows.

Such areally implemented, electrically conductive coatings can advantageously be used to increase the asymmetry of the switching behavior according to the invention. For this, the electrically conductive coating is preferably arranged in a plane which, viewed from the contact region, faces away from the outer surface, via which switching is to be done.

In an advantageous embodiment of the composite pane, in particular as a side pane, at least one contact wire is arranged in the vicinity of one side edge, in particular the upper edge of the side pane. The distance of the contact region of the contact wire to the directly adjacent side edge is less than 2 cm, preferably less than 1 cm. The capacitive switching region of the contact wire can, for example, serve as a contact sensor of a movable composite pane and be connected to the movement mechanism such that upon triggering of a switching signal the travel of the composite pane is stopped. This is advantageous in particular with a side pane in order to prevent trapping of a body part between a closing window pane and a stationary window frame. The capacitive switching region then serves as an anti-pinch sensor.

The invention further includes a method for producing a composite pane according to the invention, at least comprising
(a) Cutting an intermediate layer to size,
(b) Applying two busbars and at least one heating wire on a surface of the intermediate layer, wherein the heating wire is electrically conductingly connected to both busbars, and
Applying at least one contact wire on the surface of the intermediate layer,
(c) Producing a stack sequence of a substrate, the intermediate layer with the heating wire, the busbars, and the contact wire, and a cover pane, and
(d) Laminating the stack sequence to form a composite pane.

The intermediate layer is provided in the form of at least one film.

The busbars, the heating wire, and the contact wire are preferably heated, at least in regions, during or before application on the intermediate layer.

The mounting of the busbars can, in particular, be done by placement, but also by adhesive bonding. The heating of the busbars is done, for example, with a soldering iron. By means of the heating, the thermoplastic intermediate layer is to be slightly melted and thus bonded to the busbar. The temperature is preferably from 150° C. to 240° C.

Instead of using a soldering iron, it is also possible to apply the busbars on the intermediate layer with a plotter and a heated wheel or to embed them in the surface thereof.

If the heating wire is to be arranged sandwich-like between two busbars, the upper busbar (i.e., the one that is farther from the intermediate layer at the time of placement on the intermediate layer) is preferably fixed with a higher temperature, for example, from 300° C. to 360° C.).

The application of the heating wire, of the contact wire, and/or of the surrounding contact wire is preferably done with a so-called "plotter". Here, the heating wire, the contact wire, or the surrounding contact wire is moved with a robot arm and reeled off a spool. The heating wire, the contact wire, or the surrounding contact wire is preferably heated during application such that the thermoplastic intermediate layer melts and bonds to the heating wire, the contact wire, or the surrounding contact wire. In particular, the heating wire, the contact wire, or the surrounding contact wire should penetrate completely or partially into the surface of the intermediate layer such that it is embedded in the surface of the intermediate layer.

The production of the composite glass by lamination is done with customary methods known per se to the person skilled in the art, for example, autoclave methods, vacuum bag methods, vacuum ring methods, calender methods, vacuum laminators, or combinations thereof. The bonding of the substrate and the cover pane is customarily done through the action of heat, vacuum, and/or pressure.

A further aspect of the invention includes the use of the composite pane according to the invention preferably as a vehicle window in means of transportation for travel on land, in the air, or on water, in particular in motor vehicles, as a side pane, a windshield, a rear window, or a roof panel. The composite pane according to the invention is particularly preferably used as a side pane for an openable side window of a vehicle. This means a side window that can be opened and closed again by substantially vertical displacement of the side pane into the vehicle body door.

The composite pane according to the invention can, however, also be used as an architectural pane or glazing in furniture, for example, a refrigerator, a freezer, or an electrical heater or mirror element.

In the following, the invention is described in detail with reference to drawings and exemplary embodiments. The drawings are schematic representations and not true to scale. The drawings in no way restrict the invention.

Figure 1B:
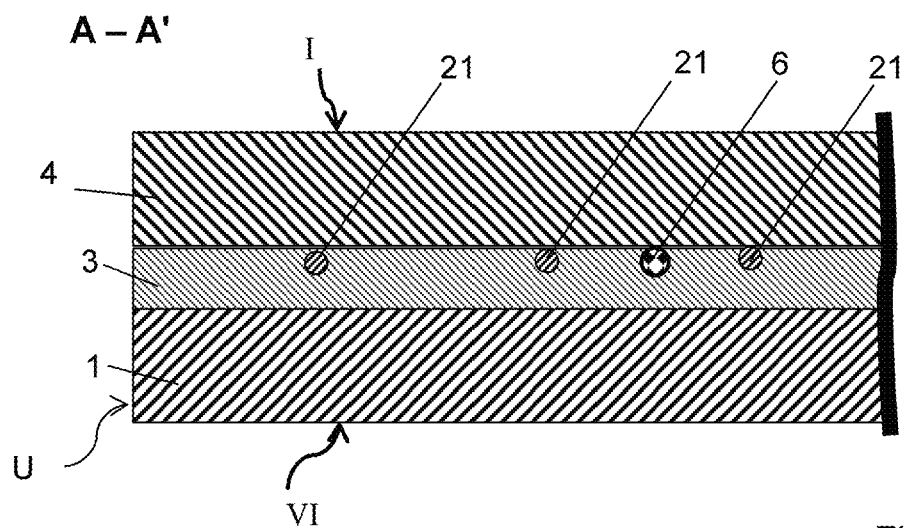
Figure 1C:
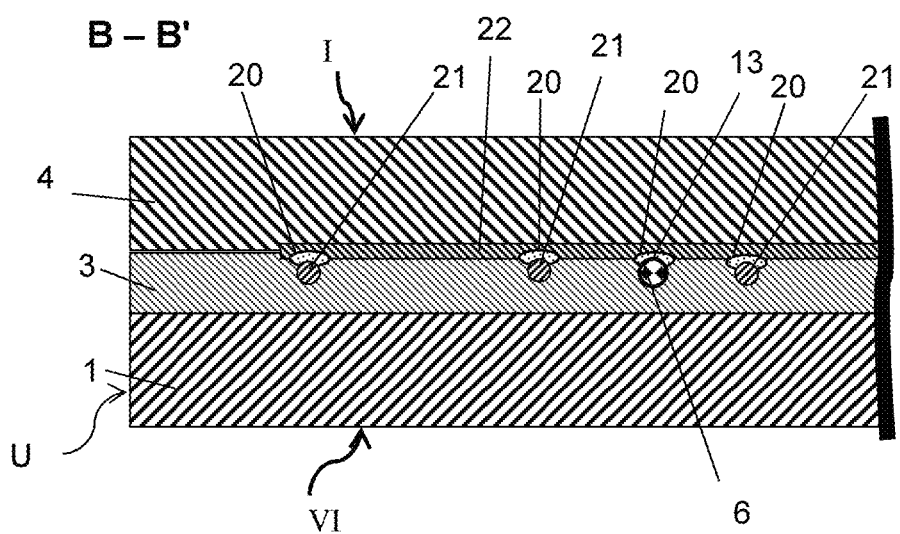
Figure 2A:
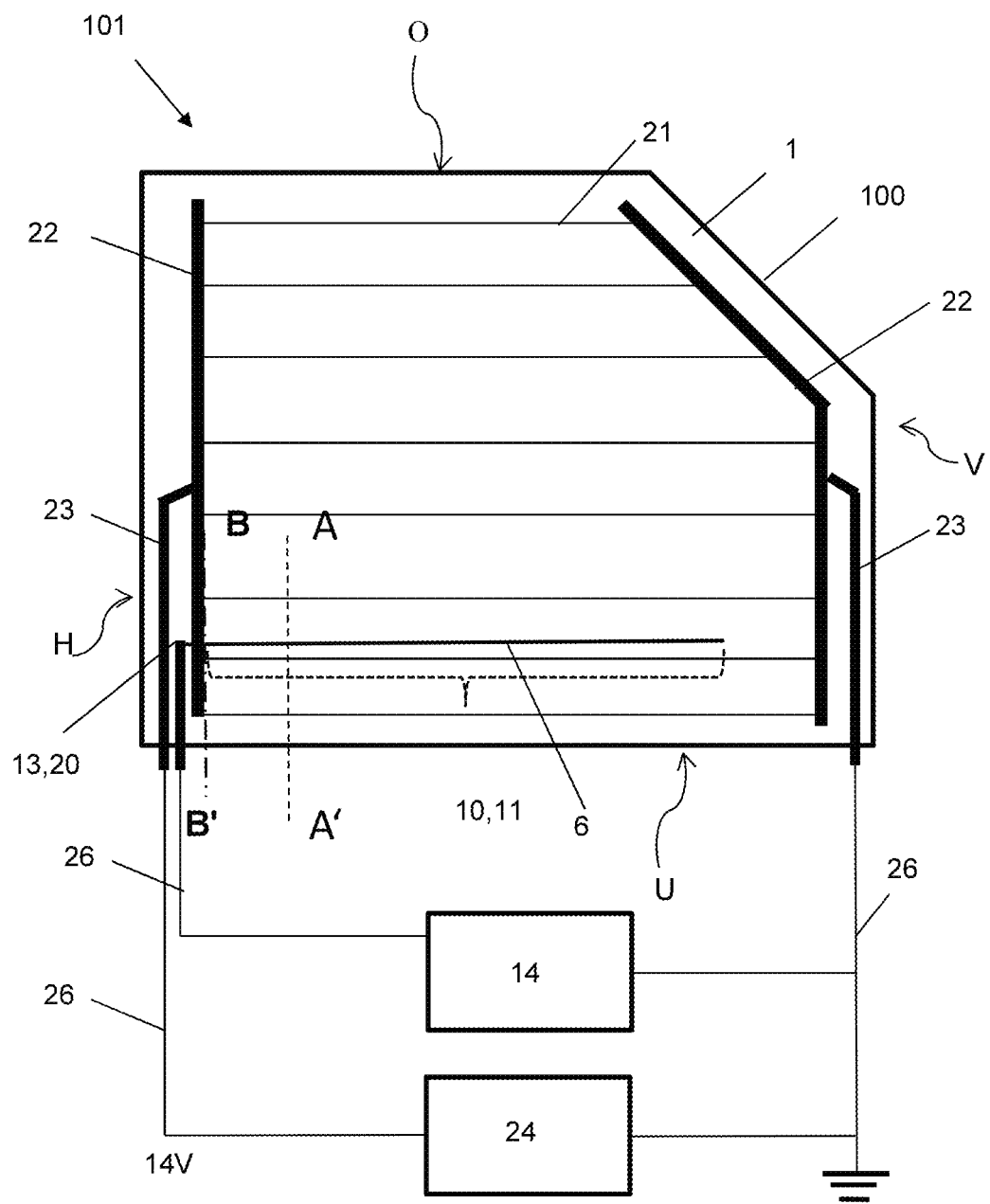
Figure 2B:
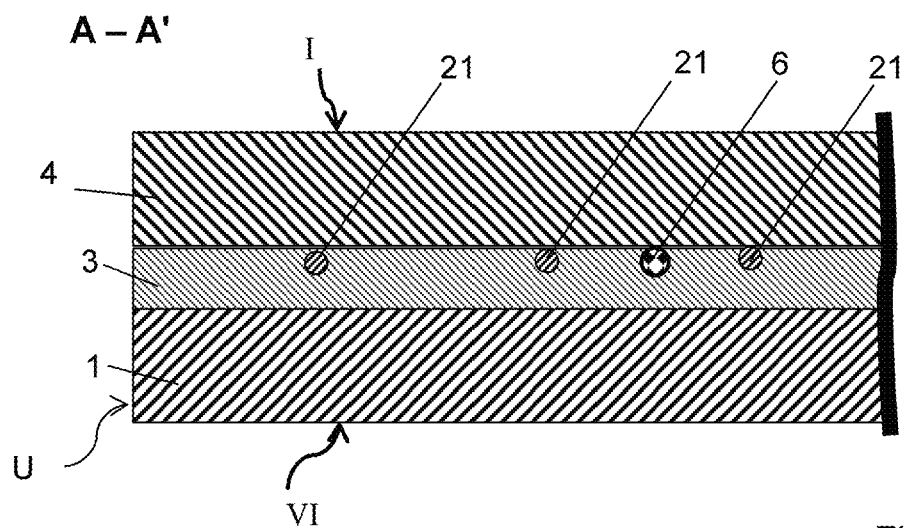
Figure 2C:
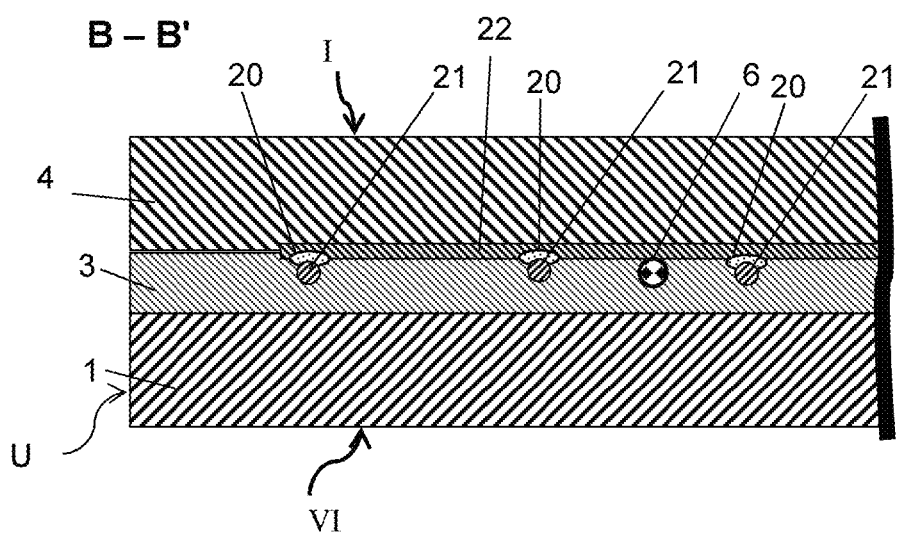
Figure 3A:
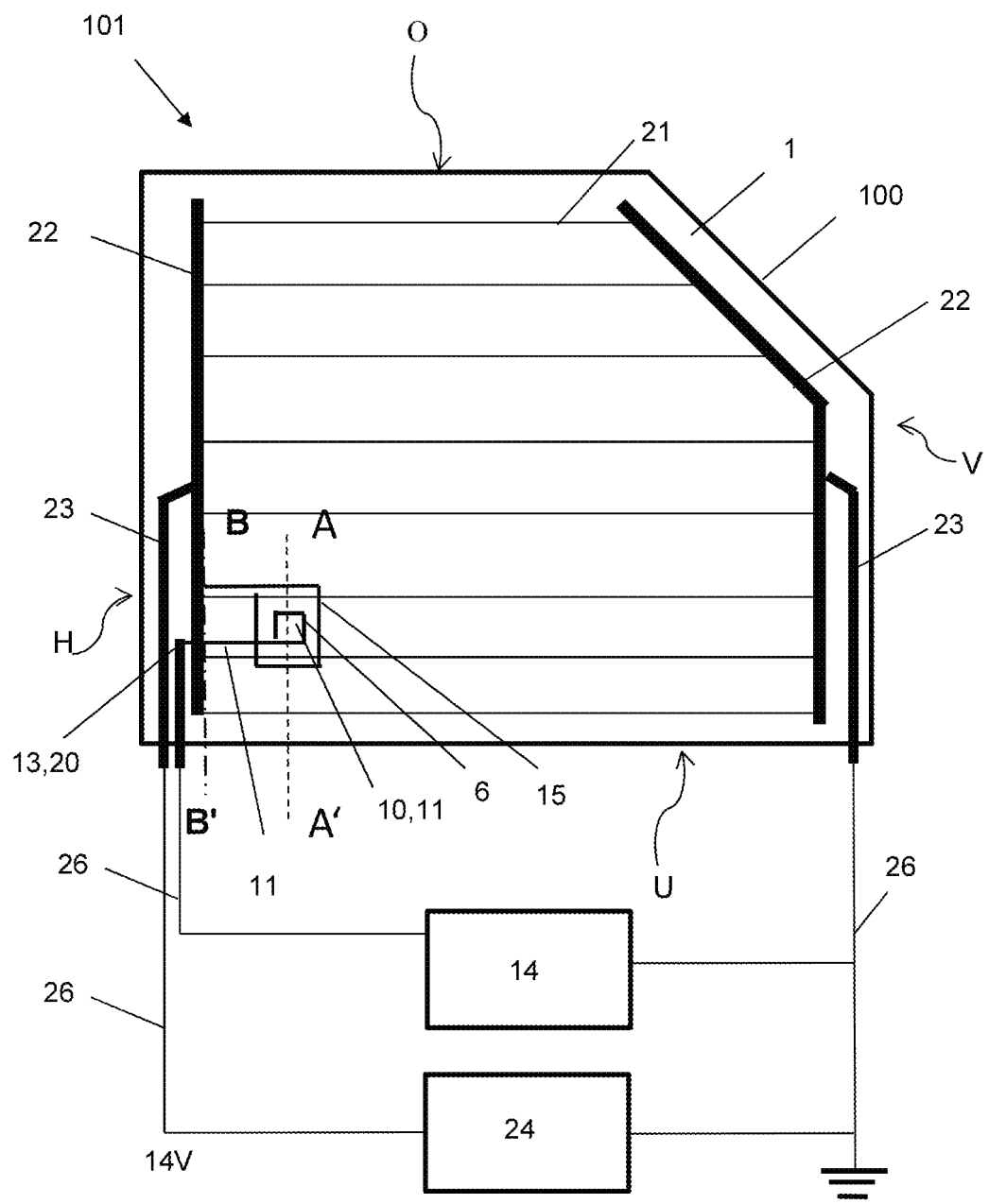
Figure 3B:
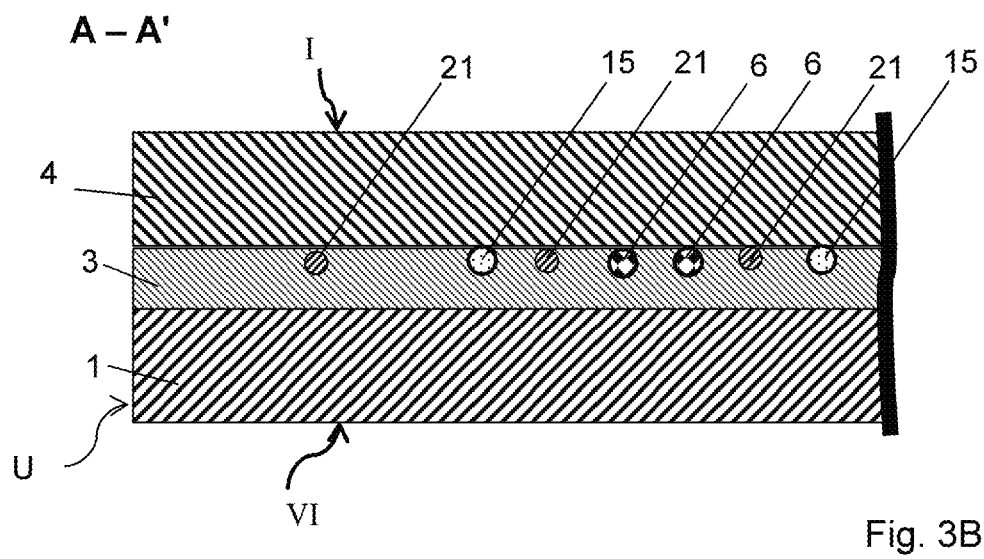
Figure 3C:
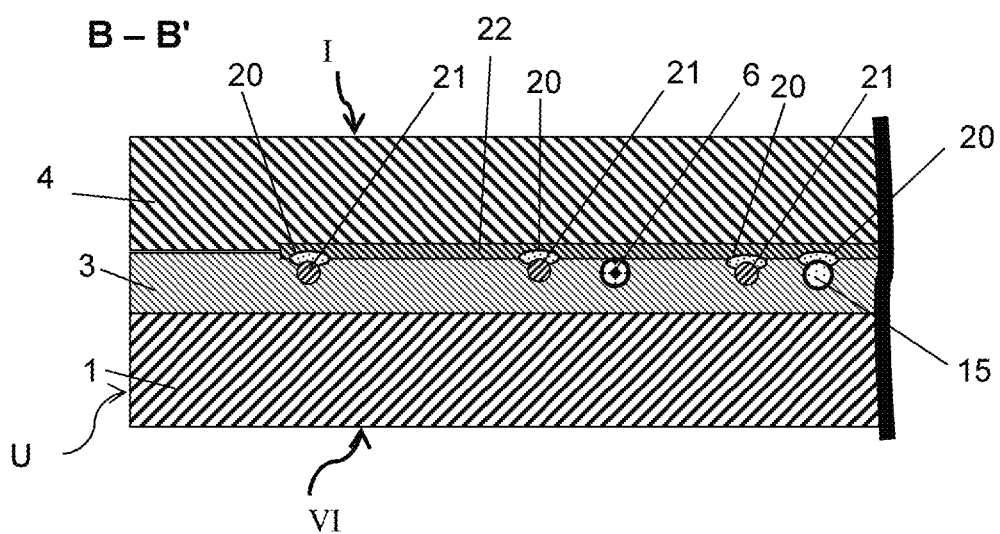
Figure 3D:
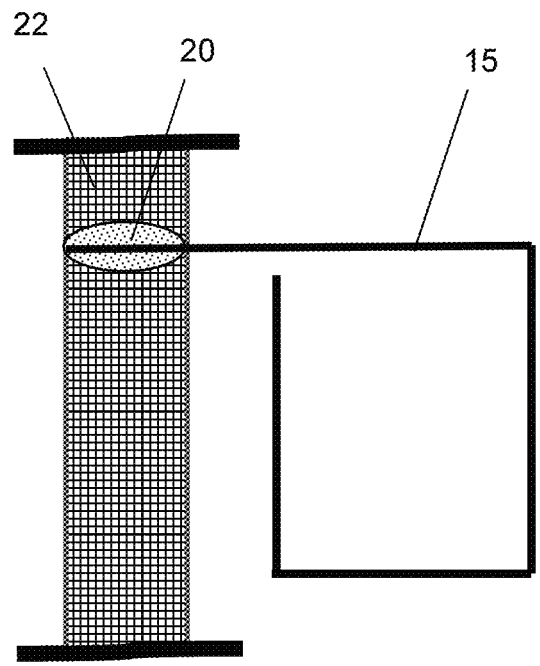
Figure 3E:
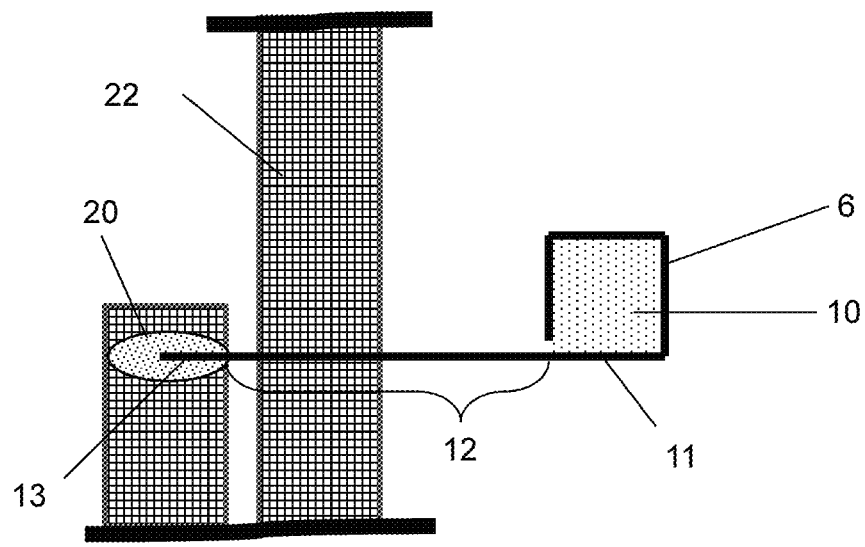
Figure 4A:
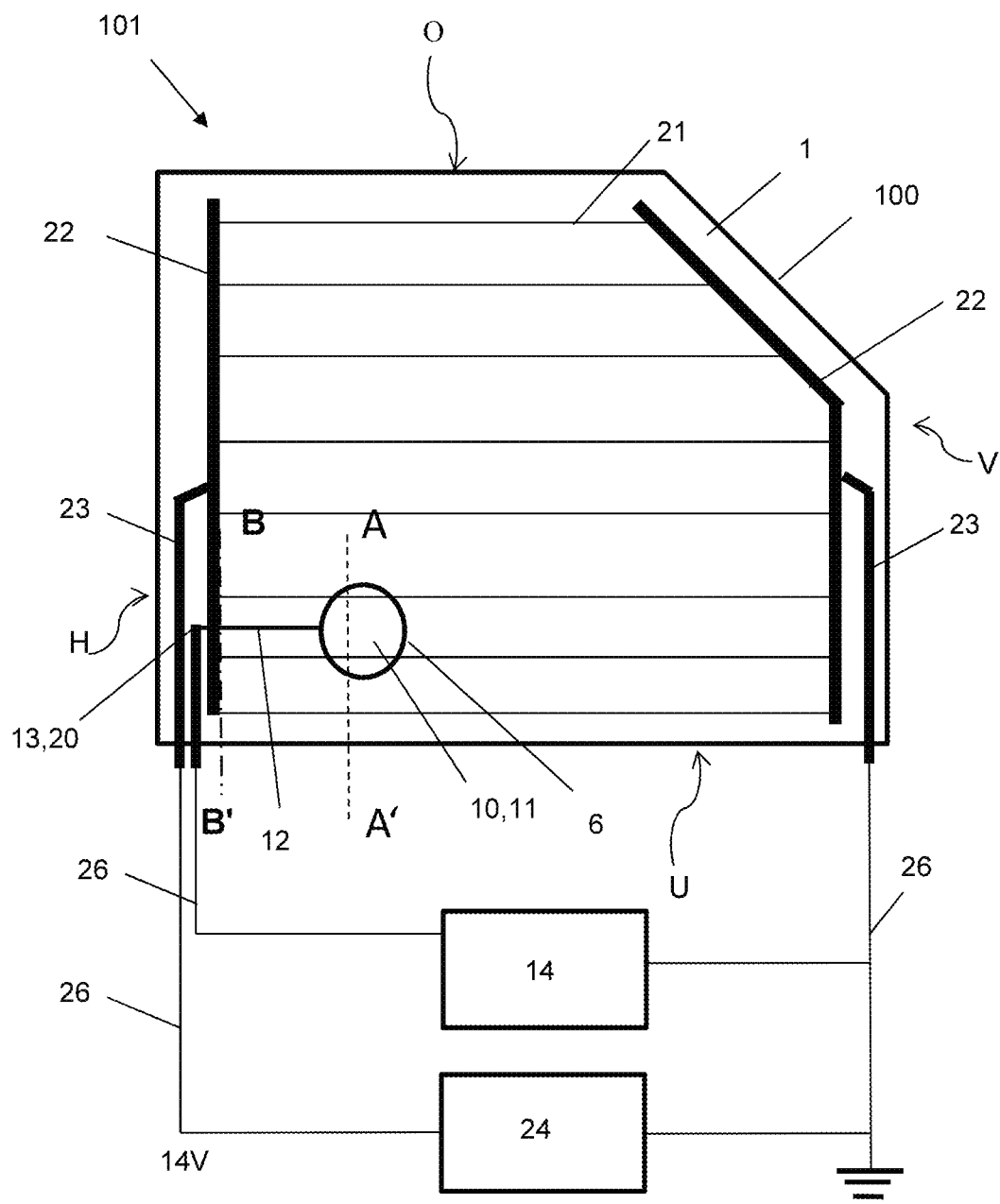
Figure 4B:
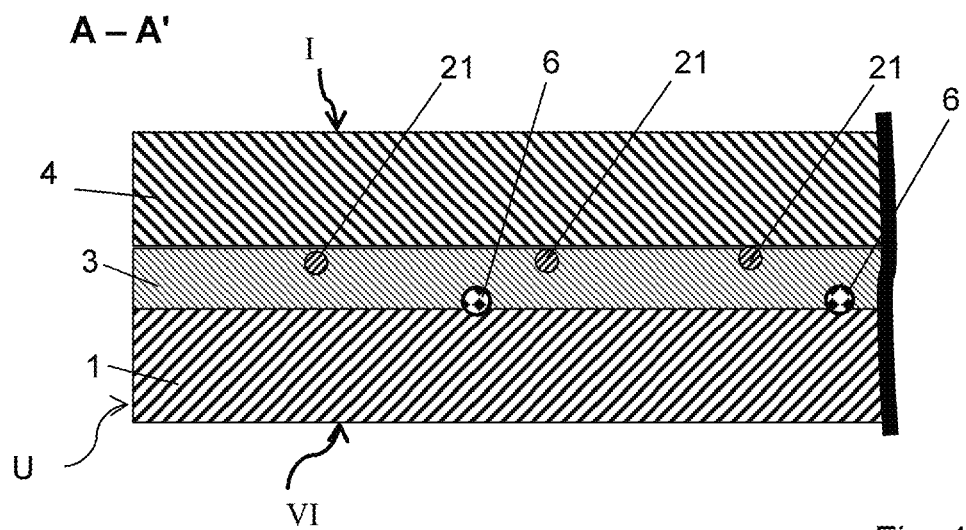
Figure 4C:
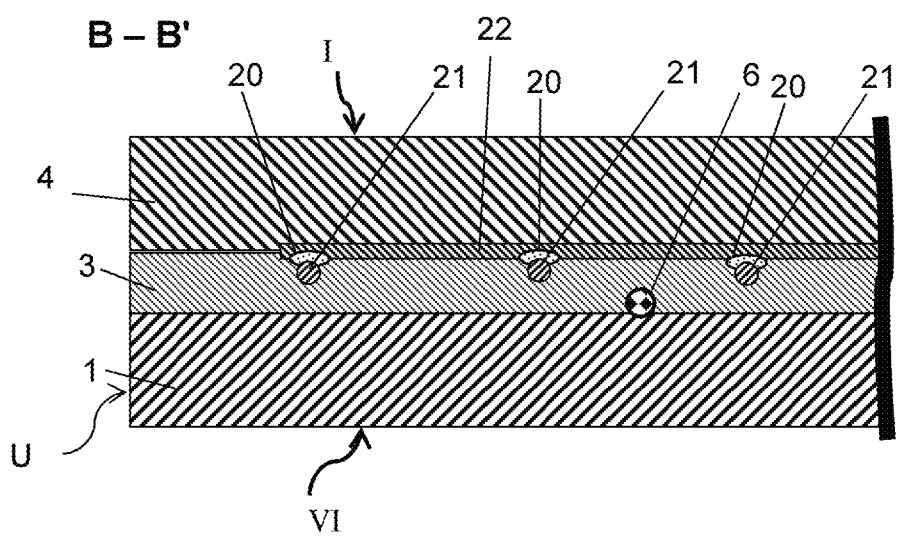
Figure 5:
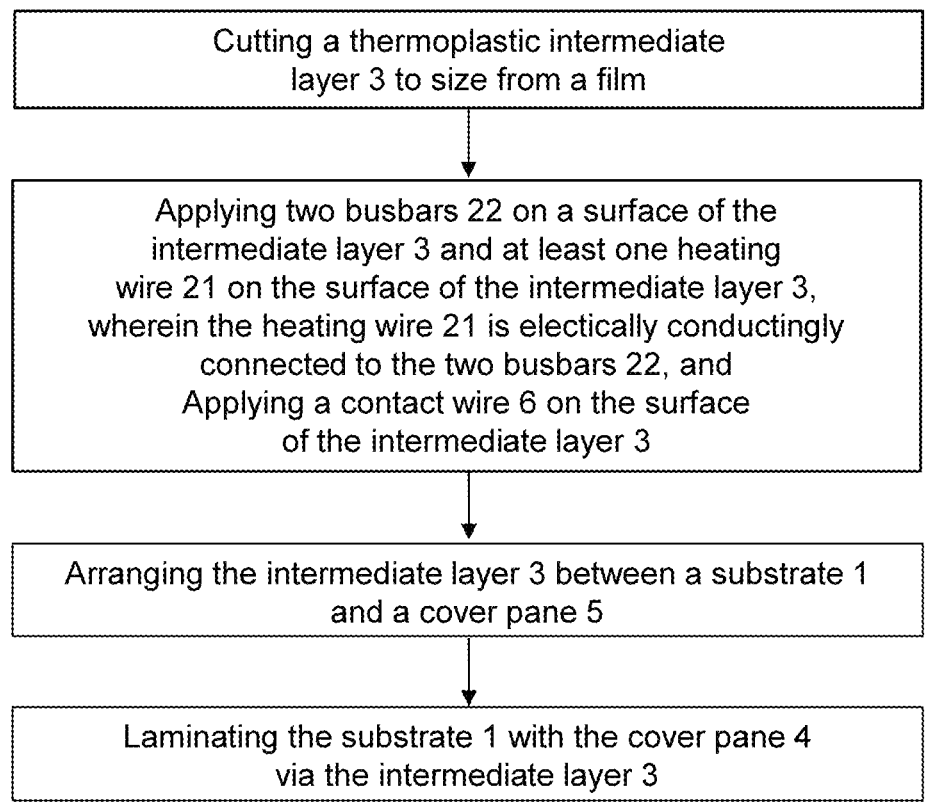

They depict:

FIG. 1A a plan view of an embodiment of a composite pane according to the invention, FIG. 1B a section along A-A' through the composite pane of FIG. 1A, FIG. 1C a section along B-B' through the composite pane of FIG. 1A, FIG. 2A a plan view of an alternative embodiment of a composite pane according to the invention, FIG. 2B a section along A-A' through the composite pane of FIG. 2A, FIG. 2C a section along B-B' through the composite pane of FIG. 2A, FIG. 3A a plan view of another alternative embodiment of a composite pane according to the invention, FIG. 3B a section along A-A' through the composite pane of FIG. 3A, FIG. 3C a section along B-B' through the composite pane of FIG. 3A, FIG. 3D enlarged view of a detail of FIG. 3A, FIG. 3E enlarged view of a detail of FIG. 3A, FIG. 4A a plan view of another alternative embodiment of a composite pane according to the invention, FIG. 4B a section along A-A' through the composite pane of FIG. 4A, FIG. 4C a section along B-B' through the composite pane of FIG. 4A, FIG. 5 a flowchart of an embodiment of the method according to the invention.

FIG. 1A depicts a pane arrangement 101 according to the invention with a plan view of an embodiment of a composite pane 100 according to the invention. Here, the composite pane 100 according to the invention is, for example, implemented as a side pane of a motor vehicle. The side pane is intended for the side window of a passenger car, which can be opened by lowering the side pane. The composite pane 100 has a front edge V, a rear edge H, an upper edge O, and a lower edge U. The edges are referred to according to the installed position in the direction of travel.

FIG. 1B depicts a section along A-A' and FIG. 1C depicts a section along B-B' through the composite pane 100 of FIG. 1A.

The composite pane 100 comprises a substrate 1 and a cover pane 4 that are bonded to one another via an intermediate layer 3. The substrate 1 is, in this example, the inner pane of the side pane, and the cover pane 4 is the outer pane of the composite pane 100. The plan view is directed toward the outside surface IV of the substrate 1. The substrate 1 and the cover pane 4 are made, for example, of soda lime glass and have, for example, a thickness of 2.1 mm in each case. The intermediate layer 3 is, for example, formed by a film of polyvinyl butyral (PVB), with a thickness of 0.76 mm.

Here, for example, eight heating wires 21 are embedded in the surface of the intermediate layer 3 pointed toward the cover pane 4. The heating wires 21 are made, for example, of copper or tungsten and have a thickness of 30 µm. Each heating wire 21 is electrically contacted to a first busbar 22 (depicted on the left here) and a second busbar 22 (depicted on the right here). The busbars 22 are implemented as strips of a copper foil, with a thickness of, for example, 100 µm and a width of, for example, 7 mm. Wenn a voltage is applied to the busbars 22, for example, by a voltage source 25, a current flows through the heating wires 21, creating the heating action. The voltage can be the customary motor vehicle on-board voltage of 14 V, or also a voltage of, for example, 42 V or 48 V.

The first busbar 22 runs, for example, along the rear edge H of the side pane, the second busbar 22 runs, for example, along the front edge V. The first busbar 22 is connected, with electrical heating, for example, to a positive operating voltage of 14 V, and the second busbar 22 is connected to the reference ground. The maximum distance of the busbars from the edge along which they run is, for example, 2 cm. Such busbars 22 are not visible for an observer even in the opened state of the side window. Instead, the busbars 22 are covered by car body parts and sealing lips of typical side windows. The minimum distance is, for example, 6 mm. This distance is adequate to prevent a disruption of the stability of the laminate and penetration of air.

The composite pane 100 further has two supply lines 23. Each supply line 23 is electrically contacted to a busbar 22 and runs in a straight line to the lower edge U, where it can be contacted by a connecting cable 26 to the external power supply 24.

The electrical line connection 20 between the heating wires 21 and the busbars 22 is done, for example, by soldering. Since the heating wires usually have an electrically conductive sheathing, this sheathing is removed before or during the contacting procedure.

Furthermore, an electrically conductive contact wire 6 is arranged between the cover pane 4 and the intermediate layer 3. The contact wire 6 is likewise made of a copper or tungsten wire with a diameter of, for example, 30 µm. The contact wire 6 is arranged, in this example, parallel to the heating wires 21 and between two adjacent heating wires 21.

The contact wire 6 has one connection region 13, in which the contact wire 6 is electrically conductingly connected to the first busbar 22 via an electrical line connection 20, for example, via a solder joint. The contact wire 6 has, outside the connection region 13, a contact region 11. The contact region 11 extends, for example, over approx. 70% of the length of the pane. Of course, the length and shape of the contact wire 6 can be adapted to the respective requirements of the individual case. The contact wire 6 forms a capacitive switching region 10.

In this exemplary embodiment, the electrical contacting of the capacitive switching region 10 is done via the first busbar 22, which is electrically connected via the supply line 23 and a connecting cable 26 to the power supply 24 and, at the same time, to the sensor electronics system 14. A second input of the sensor electronics system 14 is electrically connected to the reference ground.

The heating wires 21 and the contact wire 6 have, for example, an electrically insulating sheathing with a matte green or matte black color, since these are visually less conspicuous than, for example, bare metal wires, which can reflect light particularly well. This has the further advantage that heating wires 21 and contact wire 6 can even overlap and touch without electrical short-circuits occurring.

FIG. 2A depicts an embodiment of a circuit [sic] arrangement 101 of an alternative composite pane 100 according to the invention. The structure of the composite pane 100 corresponds substantially to the composite pane 100 of FIG. 1A such that, in the following, only the differences are dealt with.

FIG. 2B depicts a section along A-A' and FIG. 2C a section along B-B' through the composite pane 100 of FIG. 2A. The composite pane 100 of FIG. 2A differs from the composite pane 100 of FIG. 1A in that the contact wire 6 is not electrically conductingly (galvanically) connected to the first busbar 22. In other words, there is no galvanic connection between the contact wire 6 that forms the capacitive switching region 10 and the heating circuit composed of heating wires 21, busbar 22, and their connecting lines to the power supply 24.

The contact wire 6 has, in this example, an electrically insulating sheathing and and crosses over the first busbar 22 with no galvanic connection. The connection region 13 of the contact wire 6 is then contacted outside the first busbar 22 with a supply line, which is connected via a connecting cable 26 to the first input of the sensor electronics system 14. A second input of the sensor electronics system 14 is electrically conductingly (galvanically) connected via the reference ground to the second busbar 22 and, thus, to the heating circuit. The entirety of the heating circuit consisting of heating wires 21 and busbars 22 and, in particular, the heating wires 21 arranged directly adjacent the contact wire 6 thus forms a second electrode for the differential capacitance measurement.

Of course, the contact wire 6 can also be arranged between the substrate 6 and the intermediate layer 3 or can be electrically isolated from the busbar in the crossover region by an additional (local) intermediate layer such that the electrically insulating sheathing is not absolutely necessary.

FIG. 3A depicts an alternative embodiment of a circuit [sic] arrangement 101 of a composite pane 100 according to the invention. The structure of the composite pane 100 corresponds substantially to the composite pane 100 and circuit [sic] arrangement 101 of FIG. 2A such that, in the following, only the differences are dealt with.

FIG. 3B depicts a section along A-A' and FIG. 3C a section along B-B' through the composite pane 100 of FIG. 3A. FIG. 3C depicts an enlarged view of a surrounding contact wire 15 and FIG. 3D depicts an enlarged detail of the contact wire 6.

The composite pane 100 of FIG. 3A differs from the composite pane 100 of FIG. 2A in that the contact wire 6 is not implemented rectilinearly in the contact region 11, but rather describes on one end the outline of a square with an edge length of, for example, 5 cm. The contact region 11 is connected via a supply line region 12 of a rectilinear section of the contact wire 6 to the connection region 13. The connection region 13 of the contact wire 6 is connected via an electrical line connection 20 via a connecting cable 26 to the sensor electronics system 14. The contact region 11 encompasses, in this example, a square area A of 25 cm². By means of this configuration, the sensitivity of the capacitive switching region 10 in the contact region 11 is significantly increased. The sensor electronics system 14 can, in a simple manner, be tuned such that a switching signal is triggered only upon contact of one of the surfaces of the composite pane 100 in the contact region 11 and no switching signal is triggered upon contact of the surfaces of the composite pane 100 via the supply line region 12.

As a further optional exemplary embodiment, the composite pane 100 of FIG. 3A has an electrically conducting surrounding contact wire 15. The surrounding contact wire 15 has a rectilinear section and a square-shaped section. The square-shaped section with an edge length of, for example, 10 cm surrounds, in the projection viewed through the large surfaces through the large surfaces of composite pane 100, the square-shaped contact region 11. The surrounding contact wire 15 has, in this example, an electrically insulating sheathing to prevent short-circuits to heating wires 21 crossing over. Of course, the surrounding contact wire 15 can also be arranged on a different level of the composite pane 100, for example, between the substrate 1 and the intermediate layer 3, or can be electrically isolated from the heating wires 21 by another intermediate layer or electrically insulating film.

In the example shown here, the surrounding contact wire 15 is galvanically connected on one end to the first busbar 22 via an electrical line connection 20. By means of the surrounding contact wire 15, which is arranged in the immediate area around the contact region 11, the sensitivity of the capacitive switching region 10 can again be significantly increased.

FIG. 4A depicts an embodiment of a circuit [sic] arrangement 101 of another alternative composite pane 100 according to the invention. The structure of the composite pane 100 corresponds substantially to the composite pane 100 and circuit [sic] arrangement 101 of FIG. 3A such that in the following only the differences are dealt with.

FIG. 4B depicts a section along A-A' and FIG. 4C a section along B-B' through the composite pane 100 of FIG. 4A.

In contrast to the contact wire 6 of FIG. 3A, here, the contact wire 6 is implemented circular in the contact region 11. The circle has, for example, a diameter of 8 cm. Furthermore, the contact region 11 overlaps the two immediately adjacent heating wires 21 (in projection viewed through the large area of the composite pane 100). As clearly discernible in FIG. 4C, the contact wire 6 is arranged, in this exemplary embodiment, between the substrate 1 and the intermediate layer 3. The heating wires 6, are, furthermore, arranged, for example, between the cover pane 4 and the intermediate layer 3. This increases the selectivity of the capacitive switching region 10. In other words, upon contact of the outer surface IV of the composite pane 100 via the substrate 1, the capacitance change measured in the sensor electronics system is greater than upon contact of the outer surface I of the composite pane 100 via the cover pane 4.

FIG. 5 depicts a flowchart of an exemplary embodiment of the method according to the invention for producing a heatable composite pane according to the invention having a capacitive switching region.

LIST OF REFERENCE CHARACTERS 1 substrate
3 intermediate layer
4 cover pane
6 contact wire
10 capacitive switching region
11 contact region
12 supply line region
13 connection region
14 capacitive sensor electronics system
15 surrounding contact wire
20 electrical line connection
21 heating wire
22 busbar
23 supply line of the busbar 22
24 power supply
26 connecting cable
100 composite pane
101 pane arrangement
A area of the contact region 11
A-A' section line
B-B' section line
I outer surface of the cover pane 4
IV outer surface of the substrate 1
H rear edge of the composite pane 100
O upper edge of the composite pane 100
V front edge of the composite pane 100
U lower edge of the composite pane 100

The invention claimed is:

1. A heatable composite pane having a capacitive switching region, comprising:
    a substrate and a cover pane;
    at least one intermediate layer, arranged between the substrate and the cover pane; and
    at least one heating wire and at least two busbars, arranged between the cover pane and the intermediate layer, wherein the heating wire is electrically connected to the at least two busbars in a conducting manner, such that upon application of an electrical voltage to the at least two busbars, a heating current flows through the heating wire, whereby the heating wire is heated,
    wherein an electrically conductive contact wire, different from the at least one heating wire, is arranged between the substrate and the intermediate layer or between the cover pane and the intermediate layer,
    wherein at least one region of the electrically conductive contact wire forms a capacitive switching region,
    wherein the capacitive switching region has at least one contact region and one connection region, the contact region is electrically connected to the connection region, and the connection region is configured to be electrically connected to a sensor electronics system, and wherein the contact wire is galvanically connected to one of the at least two busbars at precisely one connection region.

2. The composite pane according to claim 1, wherein the contact wire has a free end.

3. The composite pane according to claim 1, wherein the contact wire has no direct physical contact with the at least one heating wire.

4. The composite pane according to claim 1, wherein the contact wire extends over at least 10% of a shortest distance between the at least two busbars.

5. The composite pane according to claim 1, wherein the contact wire extends over at least 20% of a shortest distance between the at least two busbars.

6. The composite pane according to claim 1, wherein the contact wire extends over at least 30% of a shortest distance between the at least two busbars.

7. The composite pane according to claim 1, wherein the contact wire extends over at least 40% of a shortest distance between the at least two busbars.

8. The composite pane according to claim 1, wherein the contact wire extends over at least 50% of a shortest distance between the at least two busbars.

9. The composite pane according to claim 1, wherein the contact wire is situated, at least in a projection perpendicular to a pane surface, between two immediately adjacent heating wires, wherein each of the two immediately adjacent heating wires extend continuously from a first busbar of the at least two busbars to a second busbar of the at least two busbars.

10. The composite pane according to claim 1, wherein at least one surrounding contact wire is arranged between the substrate and the intermediate layer or between the cover pane and the intermediate layer.

11. The composite pane according to claim 1, wherein the contact region is electrically connected via a supply line region to the connection region and the supply line region has a length of 1 cm to 70 cm.

12. The composite pane according to claim 11, wherein the length of the supply line region is 1 cm to 8 cm.

13. The composite pane according to claim 1, wherein the contact region encompasses an area, wherein the area is from 1 cm$^2$ to 200 cm$^2$, and/or has a rectangular, square, trapezoidal, triangular, circular, elliptical, or drop-shaped form or rounded corners.

14. The composite pane according to claim 13, wherein the area is from 1 cm$^2$ to 50 cm$^2$.

15. The composite pane according to claim 1, wherein the intermediate layer is transparent, contains or is made of polyvinyl butyral (PVB), and/or has a relative permittivity of 2 to 4.

16. The composite pane according to claim 15, wherein the relative permittivity is 2.1 to 2.9.

17. The composite pane according to claim 1, wherein the substrate and/or the cover pane contains glass or polymers and/or has a relative permittivity of 2 to 8.

18. The composite pane according to claim 17, wherein the relative permittivity of the substrate and/or the cover pane is 6 to 8.

19. The composite pane according to claim 1, wherein the substrate and/or the cover pane contains flat glass, float glass, quartz glass, borosilicate glass, soda lime glass, polyethylene, polypropylene, polycarbonate, polymethylmethacrylate, and/or mixtures thereof.

20. A pane arrangement, comprising:
a composite pane according to claim 1; and
a capacitive sensor electronics system, galvanically connected to the connection region of the contact wire.

21. The pane arrangement according to claim 20, wherein a sensitivity of the sensor electronics system is selected such that it outputs a switching signal upon contact of the contact region with a human finger on an outer surface of the substrate and outputs no switching signal or a different switching signal upon contact of the contact region on an outer surface of the cover pane.

22. The pane arrangement according to claim 20,
wherein the contact region is electrically connected via a supply line region to the connection region, and
wherein the sensitivity of the sensor electronics system is selected such that it outputs a switching signal upon contact of the contact region on an outer surface of the substrate and/or an outer surface of the cover pane with a human finger and outputs no switching signal or a different switching signal upon contact of the supply line region on the outer surface of the substrate and/or the outer surface of the cover pane.

* * * * *